United States Patent [19]

Kompfner

[11] 4,337,993
[45] Jul. 6, 1982

[54] HOLOGRAPHIC OPTICAL FIBER COUPLER

[75] Inventor: Rudolf Kompfner, Stanford, Calif.

[73] Assignee: National Research Development Corporation, London, England

[21] Appl. No.: 99,000

[22] Filed: Nov. 30, 1979

Related U.S. Application Data

[63] Continuation of Ser. No. 728,915, Oct. 4, 1976, abandoned.

[30] Foreign Application Priority Data

Oct. 3, 1975 [GB] United Kingdom ............... 40593/75

[51] Int. Cl.$^3$ .............................................. G02B 5/32
[52] U.S. Cl. ................................ 350/96.19; 350/3.61; 350/3.7; 350/3.77; 350/162 R
[58] Field of Search ................ 350/3.60, 3.61, 3.70, 350/3.72, 3.75, 3.77, 162 R, 96.15, 96.19

[56] References Cited

U.S. PATENT DOCUMENTS 3,666,345  5/1972  Maslowski ..................... 350/3.61
3,975,082  8/1976  Winzer ........................ 350/96.19

OTHER PUBLICATIONS

Nishihara et al., "Holocoupler: A Novel Coupler for Optical Circuits," *IEEE Journal of Qu. Elect.*, vol. QE-11, No. 9, Sep. 1975, pp. 794-796.

*Primary Examiner*—John D. Lee
*Attorney, Agent, or Firm*—Cushman, Darby & Cushman

[57] ABSTRACT

An optical system comprises two arrays of optical devices and means for making individual optical connections each of which involves the passage of light between a specific device of an array and a specific device of the other array, said means comprising at least one phase grating plate in which there are formed a series of volume phase gratings, all the phase gratings being of the reflecting type, and the arrangement being such that said individual connections are respectively made via different phase gratings in at least one phase grating plate.

9 Claims, 6 Drawing Figures

HOLOGRAPHIC OPTICAL FIBER COUPLER

This is a continuation, of application Ser. No. 728,915 filed Oct. 4, 1976, now abandoned.

This invention relates to optical systems for connecting optical devices.

Recent progress in quantum electronics and related optical devices has led to the possibility that future communications and computer systems will be optically based using, for example, optical dielectric waveguides such as optical fibres. In such circumstances, a requirement may arise to couple arrays of such fibres to arrays of optical devices such as light sources, light detectors, and other fibres. While the coupling of a single optical fibre to another fibre is relatively simple, connection of a bundle of fibres having an irregular arrangement to an optical array is more difficult. Obvious requirements are low optical loss and low cross talk. Similarly, arrays of devices such as light sources may be required to be coupled to arrays of devices such as light detectors without an intermediate fibre array.

According to the invention, an optical system comprises two arrays of optical devices, and means for making individual optical connections each of which involves the passage of light between a specific device of one array and a specific device of the other array, said means comprising at least one phase grating plate in which there are formed a series of volume phase gratings, all the phase gratings being of the reflecting type, and the arrangement being such that said individual connections are respectively made via different phase gratings in at least one phase grating plate.

Each optical device may, for example, comprise a light source, light detector, light modulator, light filter or the end of an optical fibre in a random or ordered bundle.

In a first form the optical system may comprise two arrays of optical devices and one phase grating plate all fixed relative to each other, there being formed in the phase grating plate a series of volume phase gratings, each grating being such as to reflect light between a specific device in one array and a specific device in the other array.

In a second form the optical system may comprise two arrays of optical devices and two phase grating plates respectively fixed relative to the two arrays, there being formed in each plate a series of volume phase gratings, the arrangement being such that said individual connections are respectively made via different phase gratings in each phase grating plate, and the light passes between the phase grating plates as a plane wave.

It is an advantage of an optical system including a volume phase grating of the reflecting type that such a grating may in some circumstances approach 100% efficiency in theory. Consider the case of planar volume phase gratings, i.e. gratings made by recording the interference patterns resulting from the interference of two plane waves. A transmission grating is produced when the waves are incident on the recording medium from the same side, and a reflection grating is produced when the waves are incident from opposite sides. If:

2D is the angle between the directions of approach of the waves in each case;

E is the "efficiency" of converting an input wave into an output wave;

$n_1$ is the amplitude of the refractive index variation recorded in the recording medium;

d is the thickness of the recording medium;

w is the wavelength of light in the recording medium; and $$K = \pi n_1 d / w \cos D;$$

then, assuming that there is no attention in the recording medium;

for a transmission grating $E = \sin^2 K$, and for a reflection grating $E = \tan h^2 K$.

The equations show that a transmission grating is theoretically 100% efficient only when K is an odd multiple of $\pi/2$; in practice, K probably varies with distance from the axis of an approaching wave, so that only infinitesimal portions of the grating can be 100% efficient, and the whole grating may be considerably less efficient in theory.

However, a reflection grating approaches 100% efficiency at large values of K; for example, if $K = 3\pi/4$, then $E = 0.96$; therefore if a reflection grating is thick enough, theoretically it will be highly efficient.

Also according to the present invention, a method of making a phase grating plate for said first form of optical system comprises arranging in relatively fixed positions the two arrays of optical devices and a body of a material capable of forming a volume phase grating, forming in said body in turn a series of volume phase gratings corresponding respectively to the required individual optical connections, each phase grating being formed by causing a beam of coherent light to pass between the relevant two devices in the two arrays, the beam passing first in one sense through said body and then being reflected to pass in the opposite sense through said body, whereby the passage of the incident and reflected beams produces in the body an interference pattern which is recorded by the body to form a volume phase grating of the reflecting type.

The body of material may be such as to require developing and fixing in order to fix permanently the refractive index changes caused by exposure to the interference patterns, and is suitably a body of holographic medium in plate-like form.

When one of the arrays comprises the ends of a bundle of optical fibres, the phase grating plate may conveniently be made using a beam from a laser device transmitted along each fibre in turn.

Further according to the invention, a method of making a phase grating plate for said second form of optical system comprises arranging in relatively fixed positions an array of optical devices and a body of a material capable of forming a volume phase grating, and forming in said body in turn a series of volume phase gratings, each phase grating being formed by irradiating the body with coherent light consisting of a first beam passing between one of the devices in the array and the body and one of a series of reference beams whose axes respectively have different orientations with respect to the body, the reference beam having a plane wavefront and being incident on the body in the opposite sense to the first beam, whereby the simultaneous passage of the two beams produces in the body an interference pattern which is recorded by the body to form a volume phase grating of the reflecting type.

Each volume phase grating in the phase grating plate made by this method has associated with it an orientation corresponding to the orientation of the reference beams used to make the grating. If a plane wave is incident on the phase grating plate at one of these orientations, one grating will reflect the plane wave to form a beam converging on or apparently diverging from one device in the array. If a beam diverging from a device in the array is incident on the phase grating plate, one grating will reflect the beam to form a plane wave at one of the associated orientations.

Such a phase grating plate and relatively fixed array of devices together comprise one half of the second form of optical system according to the invention. Two such halves can be joined to form a complete optical system provided the sets of orientations associated with the plates can be matched. Conveniently the orientations are spaced at equal angles around a cone. The orientations associated with two phase grating plates can then be aligned by rotation of one plate, provided the plates are parallel.

The invention will now be described by way of example with reference to the accompanying drawings in which.

Figure 1A:
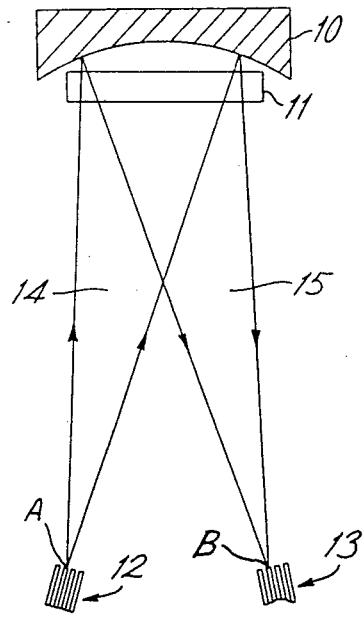
FIG. 1(a) is a schematic diagram of apparatus for making a volume phase grating plate for the first form of optical system.

In FIG. 1(a), two bundles 12, 13 of optical fibres, there being equal numbers of fibres in each bundle, are arranged with one end of each bundle directed towards the same side of a plate-shaped body of holographic medium 11 behind which lies an adjustable concave reflector 10.

Figure 1B:
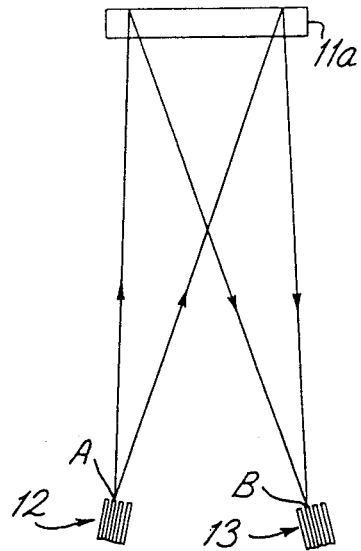
FIG. 1(b) is a schematic diagram of the first form of optical system.

Consider fibre A in bundle 12; light from a laser source (not shown) is directed along the fibre A and leaves the end of the fibre in a divergent beam 14 which passes through the holographic medium 11, is reflected by the reflector 10 and passes back through the medium 11 in a convergent beam 15 and is focused on a fibre B in bundle 13. Initially, the beam intensity is low, the reflector 10 is moved until the beam is accurately focused on fibre B, i.e. until fibre B receives maximum illumination, and the beam intensity is then increased for a suitable interval of time until the interference fringes produced by the beams 14, 15 in the medium 11 are recorded by the medium. A second fibre in bundle 12 is then illuminated and the reflector 10 adjusted until a corresponding second fibre in bundle 13 is illuminated and interference fringes are recorded. After all the fibres in bundle 12 have been illuminated, the light focused on a corresponding fibre in bundle 13, and the corresponding fringes recorded, the holographic medium is removed, developed and fixed, taking care that substantially no changes in volume or shape occur, and replaced in position with respect to the ends of the fibre bundles to the highest degree of accuracy. The developed medium now comprises a volume phase grating plate 11a. An optical system using the plate 11a is shown in FIG. 1(b). The reflector 10 is no longer required. If fibre A in bundle 12 is illuminated with light from the laser, the grating in plate 11a made by a beam from fibre A to fibre B will reflect the light diverging from the end of fibre A into a beam focused on the end of fibre B; and illumination of several or all of the fibres in bundle 12 will result in the light being reflected by the appropriate gratings in the plate 11a to the corresponding fibres in bundle 13. Similarly, if fibres in bundle 13 are illuminated, light will be reflected by the plate 11a to the corresponding fibres in bundle 12.

The bundles are the usual irregular arrays of fibres, and the arrangements of fibre ends in each bundle need not be known so long as there is no alteration either of the position of fibre ends within a bundle or of the relative positions of the bundle ends after the plate has been made. The plate 11a shown in FIG. 1(b) is therefore specific to the ends of the two bundles of fibres used to produce it, and is capable of coupling only those two bundle ends in those relative positions and orientations, and only when the plate itself is in one particular position and orientation relative to the bundle ends.

Figure 2:
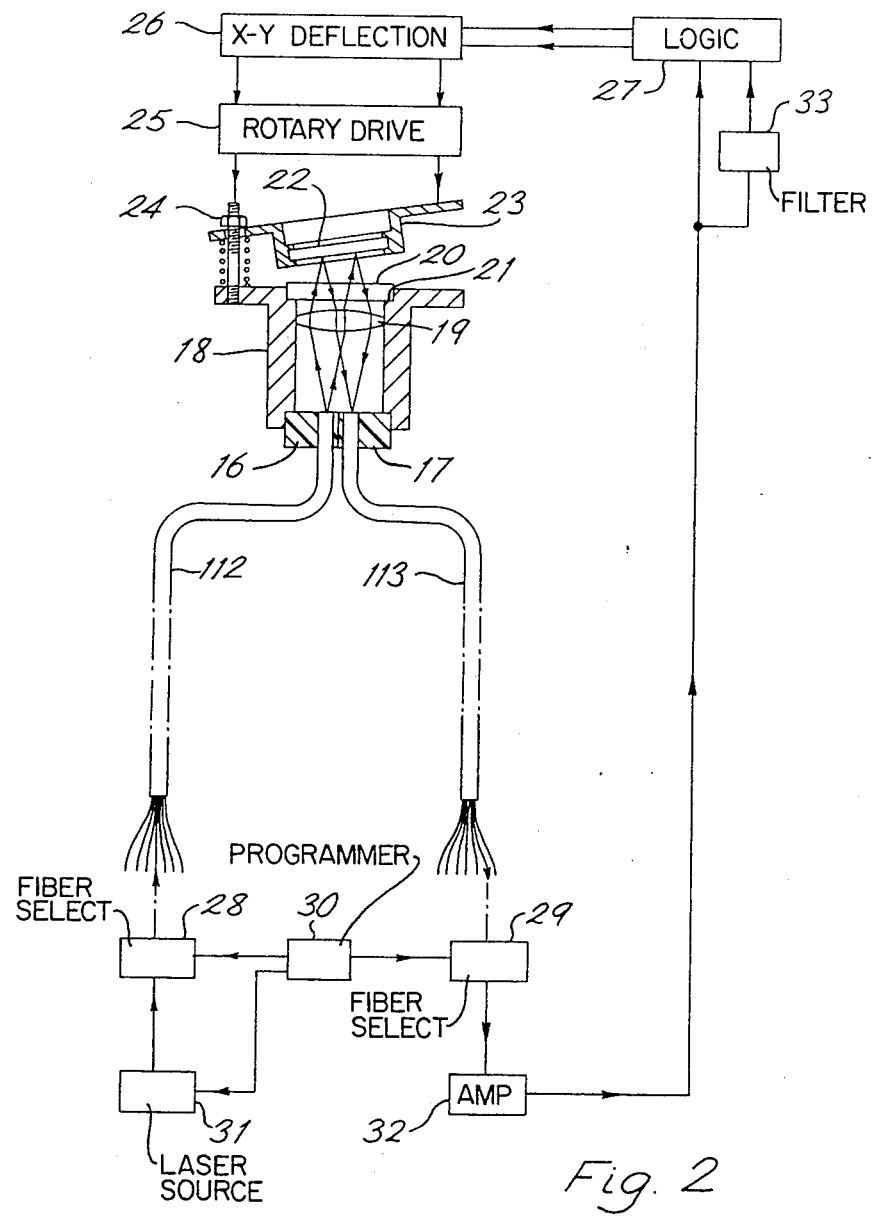
FIG. 2 is a schematic diagram of a complete apparatus for making a plate for the first form of optical system.

In FIG. 2, two fibre cables 112, 113 which are to be optically connected are each permanently fixed at one end in two adjacent blocks of epoxy resin 16, 17 held in a tubular Invar support 18 which also carries a convex lens 19 in the focal plane of which the ends of the fibre cables lie. Behind the lens is a plate-shaped body of holographic medium 20 carried by a shoulder 21 of support 18, and behind the body 20 is a front silvered plane mirror 22 in a carriage 23. The carriage and mirror can be tilted in their relation to the body 20 by a spring loaded screw 24 which is located in a flanged portion of the support 18. The carriage 23 is also connected to a rotary drive means 25 which can rotate the carriage 23 and mirror 22 about the axis of the lens 19 and the rotary drive means is supported by x-y deflection means 26 which can move the drive means 25, carriage 23 and mirror 22 in a plane perpendicular to the axis of the lens 19. The rotary drive means 25 and deflection means 26 are controlled by a search routine logic circuit 27.

The ends of the fibre cables 112, 113 remote from the epoxy blocks may be separated into individual fibres which are placed adjacent first and second fibre selection means 28, 29 connected to a control programmer 30. The first fibre selection means 28 can cause each fibre in cable 112 to be illuminated by a laser source 31 and the second fibre selection means can cause the illumination of the fibres in cable 113 to be detected by a detector and amplifier 32 which is connected to the logic circuit 27 both directly and through a filter 33. The screw 24 allows initial approximate adjustment of mirror 22 to focus light from cable 112 on to the end of cable 113.

In use the programmer 30 passes a signal to the selection means 28 to cause low intensity illumination of one fibre in cable 112; the light emerges from the other end of the fibre in a beam which passes through the lens 19 and medium 20, is reflected by the mirror 22 through the medium 20 and is focused on the end of one fibre in cable 113. The logic circuit causes the position of mirror 22 to be adjusted by the rotary drive means 25 and deflection means 26 in a suitable predetermined manner until maximum illumination is detected by detector 32; the intensity of laser source 31 is then increased. After all fibres in cable 112 have been illuminated, the medium 20 is removed, developed, and replaced in position with the highest degree of accuracy. The first form of optical system according to the invention then comprises the volume phase grating plate constituted by the developed medium 20, support 18, lens 19 and the cables 112 and 113 in their epoxy blocks. The ends of the cables remote from the epoxy blocks can be coupled to any suitable type of optical apparatus.

Figure 3A:
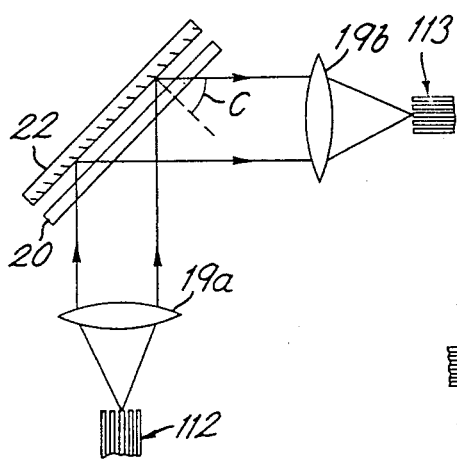
FIG. 3(a) is a schematic diagram illustrating the optical principle of the arrangement in FIG. 2.

In FIG. 3(a), the apparatus differs physically from that in FIG. 2 in that two lenses are used, but the apparatus is optically identical to that in FIG. 2. The ends of a first bundle of fibres 112 are placed at the focus of a convex lens 19a so that a light beam diverging from one fibre is directed as a parallel beam through a plate-shaped body of holographic medium 20, is reflected by the front silvered plane mirror 22 back through the medium in a parallel beam and is focused by a convex lens 19b on to the end of a fibre in a second bundle 113.

The interference fringes recorded in the medium will be planar, which has the advantage of ease of theoretical analysis, but the disadvantage of the risk of higher cross talk and large power loss because each fringe will cause Bragg reflection of the radiation in an infinity of directions distributed about a cone of half angle C. This may be improved if all the fibre ends lie in the plane of the figure, but such an arrangement clearly limits the number of fibres which can be coupled.

Figure 3B:
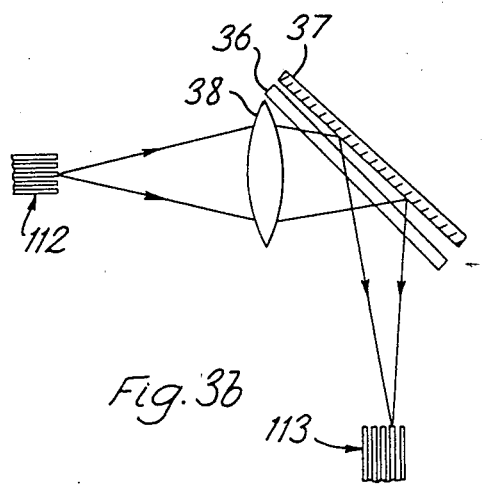
FIG. 3(b) is a schematic diagram of a preferred optical arrangement.

A preferred optical arrangement is shown in FIG. 3(b) in which the first bundle of fibres 112 is placed at a distance from a convex lens 38 equal to twice the focal length. Light passing from a fibre in bundle 112 passes through the lens 38 and through a body of holographic medium 36 in an incident beam and is reflected by a plane reflector 37 to pass through the medium 36 to the second bundle of fibres 113 which is also placed at an optical distance from the lens equal to twice the focal length. In this arrangement, light from any fibre in bundle 112 can be focused on any fibre in bundle 113, (and vice versa) merely by adjusting the position of the plane reflector 37. Thus FIG. 2 is to be regarded as illustrative in principle only; a practical embodiment should use the optical arrangement of FIG. 3(b). The fringes recorded by the material 37 will then be hyperboloidal.

Figure 4:
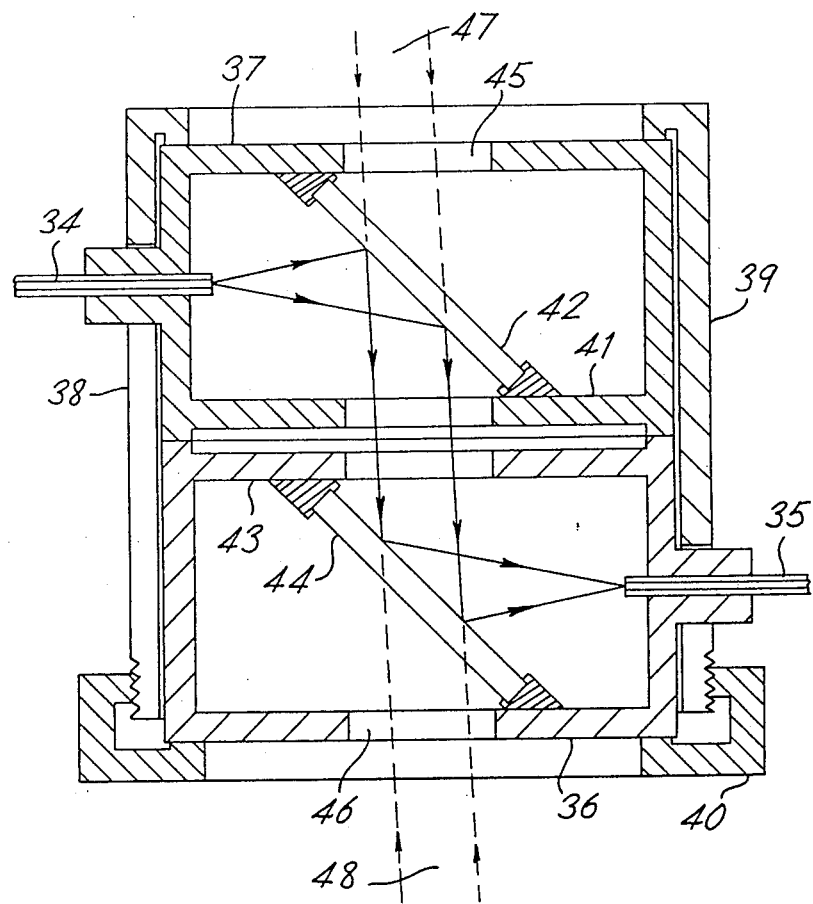
FIG. 4 is a schematic cross-section of the second form of optical system.

FIG. 4 illustrates the second form of optical system according to the invention. A two-part housing 36, 37 is held together by clamps 38, 39 and a locknut 40. One end of a fibre optic cable 34 is held by part 37, and one end of a fibre optic cable 35 is held by part 36. A first phase grating plate 42 associated with cable 34 is supported between the sidewall of the housing part 37 and a flange 41. A second phase grating plate 44 associated with cable 35 is supported between the sidewall of the housing part 36 and a flange 43. The plates 42, 44 are parallel, and their positions are such that light from a fibre in one cable can be reflected successively by a grating formed in each plate on to the corresponding fibre in the other cable. In this embodiment the phase grating plates are made by separating the parts of the housing, illuminating a plane-parallel body of holographic medium through each fibre in turn, and simultaneously illuminating the medium with a reference beam having a plane wavefront through the windows 45, 46 in the housing.

For example, a grating in plate 42 is produced by interference of light from one of the fibres in cable 34 with a reference beam 47, indicated by broken lines. Light from the corresponding fibre in cable 35 is caused to interfere with a reference beam 48 which lies in the same orientation with respect to the assembled housing as the beam 47, but is antiparallel to beam 47, the beam 48 passing through the window 46. The second corresponding fibres in each cable are illuminated and the light caused to interfere with second reference beams which have the same directions of motion with respect to the housing as beams 47, 48 but which are oriented so as to make a small angle with the orientations of beams 47 and 48. Conveniently the reference beams are distributed at equiangular spacings around a cone of small half angle, whose axis lies in the general direction of travel of all the beams.

Each half of the housing is non-specific, i.e. it may be connected to a different half provided the grating in that different half lies parallel to the grating in the first half and was made by exposure to reference beams which were anti-parallel to the reference beams used to produce the grating in the first half. The distance between the gratings is not critical.

Although the invention has been described with reference to arrangements in which the arrays of devices are the ends of bundles of optical fibres, the invention may also be used to connect arrays of devices which comprise other types of optical devices. In addition, optical systems may be constructed in which there are a different number of devices in the arrays, and one device in one array is connected to two or more devices in the other array; similarly in systems having the same number of devices in each array, a device in one array may be connected to two or more devices in the other array.

I claim:

1. An optical system comprising two arrays of optical devices, and means for making individual and simultaneous optical connections each of which involves the passage of light between each selected device of one array and one selected device of the other array to the exclusion of unselected devices, said means comprising at least one phase grating plate in which there are formed a series of volume phase gratings by incidence of complementary reference beams on a holographic medium at different angles, all the phase gratings being of the reflecting type, and the arrangement being such that said individual connections are respectively made via different phase gratings in at least one phase grating plate.

2. A first form of optical system according to claim 1 comprising two arrays of optical devices and one phase grating plate all fixed relative to each other, there being formed in the phase grating plate a series of volume phase gratings, each grating being such as to reflect light between a specific device in one array and a specific device in the other array.

3. A second form of optical system according to claim 1 comprising two arrays of optical devices and two phase grating plates respectively fixed relative to the two arrays, there being formed in each plate a series of volume phase gratings, the arrangement being such that said individual connections are respectively made via different phase gratings in each phase grating plate, and the light passes between the phase grating plates as a plane wave.

4. An optical system according to claim 1 in which the at least one phase grating plate comprises a body of holographic medium in plate-like form.

5. An optical system according to claim 1 in which at least one array of optical devices comprises the ends of a bundle of optical fibres.

6. A method of making a phase grating plate for a first form of optical system comprising arranging in relatively fixed positions two arrays of optical devices and a body of a material capable of forming a volume phase grating, and forming in said body in turn a series of volume phase gratings corresponding respectively to the required individual optical connections between each selected device in one array and one specific device in the other array to the exclusion of unspecified devices, each phase grating being formed by causing a beam of coherent light to pass between the relevant two devices in the two arrays, the beam passing first in one sense through said body and then being reflected to pass in the opposite sense through said body, whereby the passage of the incident and reflected beams produces in the body an interference pattern which is recorded by the body to form a volume phase grating of the reflecting type.

7. A method according to claim 6 in which the body of material requires developing and fixing in order to fix permanently the refractive index changes caused by exposure to the interference patterns.

8. A method according to claim 7 in which the body of material is a body of holographic medium in plate-like form.

9. A method according to claim 6 in which at least one array of optical devices comprises the ends of a bundle of optical fibres and the phase grating plate is made by transmitting a beam from a laser device along each fibre in turn.

* * * * *